(12) United States Patent
Maestas et al.

(10) Patent No.: US 7,599,479 B2
(45) Date of Patent: Oct. 6, 2009

(54) SYSTEMS AND METHODS FOR GENERATING BILLS

(75) Inventors: Rafael Maestas, Lakewood, CO (US);
Bryan Spencer, Manassas, VA (US);
Cathy M. Dunn, Castle Rock, CO (US)

(73) Assignee: Nextel Communications Inc., Reston, VA (US)

( * ) Notice: Subject to any disclaimer, the term of this patent is extended or adjusted under 35 U.S.C. 154(b) by 947 days.

(21) Appl. No.: 11/104,494

(22) Filed: Apr. 13, 2005

(65) Prior Publication Data
US 2006/0233331 A1 Oct. 19, 2006

(51) Int. Cl.
*H04M 15/00* (2006.01)

(52) U.S. Cl. ............... 379/119; 379/121.03; 705/34; 705/40

(58) Field of Classification Search ........... 379/111, 379/112.01, 112.06, 112.07, 112.08, 114.01, 379/114.03, 115.01, 116, 119, 120, 121.01, 379/121.03, 121.05, 122, 127.04, 133–136; 705/34, 39, 40
See application file for complete search history.

(56) References Cited

U.S. PATENT DOCUMENTS

| | | | |
|---|---|---|---|
| 6,072,493 A * | 6/2000 | Driskell et al. | 715/854 |
| 2004/0083167 A1* | 4/2004 | Kight et al. | 705/40 |
| 2005/0108153 A1* | 5/2005 | Thomas et al. | 705/39 |
| 2006/0129468 A1* | 6/2006 | Lovesy et al. | 705/35 |

* cited by examiner

*Primary Examiner*—Binh K Tieu

(57) ABSTRACT

Systems and methods for identifying charges on a bill are provided. Each charge category is assigned an associated symbol. The associated symbol appears in proximity to the corresponding charge category on the bill. If a charge category includes charge subcategories, the symbol can also appear on the bill in proximity to the charge subcategory.

18 Claims, 8 Drawing Sheets

---

> MONTHLY ACCOUNT INVOICE

February 15-March 14, 2005

| | |
|---|---:|
| Previous balance | 951.45 |
| Adjustments to previous balance | -5.00 |
| Payments as of 03/14/05 – Thank you | -706.45 |
| Outstanding Balance - Due Upon Receipt | $240.00 |
| Access and Related Items | 122.00 |
| Cellular Services | 142.86 |
| Dispatch Services | 138.93 |
| Messaging Services | 4.50 |
| Data and Third Party Services | 503.00 |
| Equipment and Retail Purchases | 215.00 |
| Government Fees and Taxes | 21.97 |
| *Total Current Charges for 123456789-123 Due 04/11/05 | $1,148.26 |
| Total Amount Due | $1,388.26 |

> MONTHLY ACCOUNT INVOICE

February 15-March 14, 2005

| | | |
|---|---|---|
| Previous balance | | 951.45 |
| Adjustments to previous balance | | -5.00 |
| Payments as of 03/14/05 – Thank you | | -706.45 |
| Outstanding Balance - Due Upon Receipt | | $240.00 |

1. 📶 Access and Related Items — 122.00
2. 👤 Cellular Services — 142.86
3. 📱 Dispatch Services — 138.93
4. ✉ Messaging Services — 4.50
5. 🌐 Data and Third Party Services — 503.00
6. 🛒 Equipment and Retail Purchases — 215.00
7. 🏛 Government Fees and Taxes — 21.97

*Total Current Charges for 123456789-123 Due 04/11/05    $1,148.26

Total Amount Due    $1,388.26

FIGURE 1a

ACCOUNT CHARGES AND ADJUSTMENTS continued

> ACCOUNT MANAGEMENT REPORTS

The following reports are compiled as a courtesy to help you analyze usage trends and manage your account activity.

Airtime Usage Detail

| Subscribers | Plan | | Incoming/ Outgoing | Peak/ Off Peak | Total Min:Sec | *Plan Min:Sec | **Other Min:Sec | Billable Min:Sec | Total Charges |
|---|---|---|---|---|---|---|---|---|---|
| 1 | Performance Plus 500 | | | | | | | | |
| | Step 1 | Cellular Usage | Incoming | Peak | 41:00 | 4:00 | | 37:00 | 2.10 |
| | | Cellular Usage | Outgoing | Peak | 13:00 | 1:00 | | 12:00 | 1.20 |
| | | Cellular Usage | Outgoing | Off Peak | 6:00 | 6:00 | | | |
| | | Dispatch Usage | Incoming | Peak | 150:00 | 100:00 | | 50:00 | 5.00 |
| | | Group Connect w/talkgroups | Incoming | Peak | 257:05 | 100:00 | | 157:00 | 50.00 |
| 1 | Unlimited 1000 | | | | | | | | |
| | Step 1 | Cellular Usage | Incoming | Peak | 6:00 | | 2:00 | 4:00 | 0.40 |
| | | Cellular Usage | Outgoing | Peak | 10:00 | 3:00 | | 7:00 | 0.70 |
| | | Cellular Usage | Outgoing | Off Peak | 119:00 | 4:00 | | 115:00 | 2.40 |
| | | Dispatch Usage | Outgoing | Off Peak | 237:30 | 200:00 | | 37:30 | 3.75 |
| 1 | Carrier National Plus 1000 | | | | | | | | |
| | Step 1 | Cellular Usage | Outgoing | Peak | 20:25 | 20:25 | | | 3.15 |
| | | Dispatch Usage | Outgoing | Peak | 366:59 | 231:30 | | 135:29 | 20.24 |
| | | Dispatch Usage | Outgoing | Off Peak | 21:34 | 18:30 | | 3:04 | 0.46 |

Total Airtime Usage Charges $89.40

*Plan Min:Sec includes rate plan and bonus minutes:seconds used.
**Other Min:Sec includes free incoming minutes:seconds used.

Dispatch Usage

| Subscribers | Plan | | Incoming/ Outgoing | Peak/ Off Peak | Total Min:Sec | *Plan Min:Sec | **Other Min:Sec | Billable Min:Sec | Total Charges |
|---|---|---|---|---|---|---|---|---|---|
| 3 | Nationwide Dispatch Service | | | | | | | | |
| | | Performance Plus 500 | Outgoing | Peak | 32:29 | | | 32:29 | 67.28 |
| | | Unlimited 1000 | Outgoing | Peak | 26:00 | | | 26:00 | 2.60 |
| | | National Plus 1000 | Outgoing | Peak | 25:60 | | | 25:60 | 2.60 |
| 2 | International Dispatch Service | | | | | | | | |
| | | Performance Plus 500 | Outgoing | Peak | 15:30 | | | 15:30 | 3.00 |
| | | National Plus 1000 | Outgoing | Peak | 8:60 | | | 8:60 | 0.45 |
| 3 | Group Dispatch Service | | | | | | | | |
| | | Performance Plus 500 | Outgoing | Peak | 190:35 | | | 190:35 | 4.90 |
| | | Unlimited 1000 | Outgoing | Peak | 190:35 | | | 190:35 | 4.90 |
| | | National Plus 1000 | Outgoing | Peak | 150:30 | | | 150:30 | 16.65 |

Total Dispatch Charges $102.38

*Plan Min:Sec includes rate plan and bonus minutes:seconds used.
**Other Min:Sec includes free incoming minutes:seconds used.

Note: This report represents minutes:seconds used as you make Nationwide Dispatch Service) and International Dispatch Service and Group Dispatch Service calls during the billing period. See Subscriber Activity Detail for individual charges and minutes used.

Shared Usage Adjustments

| Description | Total Charges |
|---|---|
| Telecom Shared Usage Adjustment | -6.80 |
| Direct Connect Shared Usage Adjustment | -40.70 |
| Messaging Shared Usage Adjustment | -1.00 |
| Data Service Shared Usage Adjustment | -2.50 |
| Total Shared Usage Adjustments | -$51.00 |

Note: This report reflects your savings for the billing period by using shared usage plans. The actual adjustments appear with the Subscriber Activity Details.

Plan Discount Report

| Subscribers | Plan | Amount | *Discount Code | Associated Discount | Discounted Plan Amount | Extended Discounted Amount |
|---|---|---|---|---|---|---|
| 1 | Performance Plus 500 | 49.99 | MULTIPLE | 4.99 | 45.00 | 4.99 |
| 1 | National Plus 1000 | 37.50 | CADIS8 | 2.50 | 35.00 | 2.50 |
| Total Plan Discount | | | | | | $7.44 |

*MULTIPLE - When more than one discount plan is attached to the rate plan.
Note: This summary report represents current number of subscribers with monthly plans and associated discounts active at the time of billing.

Subscriber Equipment Billing Allocation

Carrier Order DM02-0-23456, Feb 01, Equipment Purchase Order: ORD483
Shipping Address: Ann Roberts
123 Edmund Halley Drive, Reston, VA 22222

| Bill To | Billing Reference | Description | Quantity | Amount | Gov't Fees and Taxes | Total |
|---|---|---|---|---|---|---|
| 916-555-1236 | Ann Roberts | DESKTOP CRADLE | 1 | 95.00 | 5.00 | 100.00 |
| Total Subscriber Equipment Charges | | | | | | $100.00 |

*Subscriber Equipment Charges appear as charges under Subscriber Equipment Charges & Services section.

FIGURE 1d

SUBSCRIBER CHARGES AND ADJUSTMENTS
DETAILS FOR 916-555-1234, John Hill

> SUBSCRIBER ACTIVITY SUMMARY

Performance Plus 500 Family Access and Overage Charge Rating Table

| Tier | Monthly Access Charge | Actual Peak Minutes Used | Peak Minutes Included | Billable Minutes | Overage Rate | Overage Charge | Total Charges |
|---|---|---|---|---|---|---|---|
| 1 | 25.00 | 300 | 100 | 200 | 0.40 | 80.00 | 105.00 |
| 2 | 37.50 | 300 | 250 | 50 | 0.40 | 20.00 | 57.50 |
| 3* | 49.99 | 300 | 500 | 0 | 0.40 | 0.00 | 49.99 |

Your monthly access charge appears in the "Adjustments, Access and Other Charges" section below. Your overage charges, if any, are included in the "Telecommunications Services Charges" section below. Pro-rated charges, if applicable, are marked (P).

| | Rate/Date | Amount |
|---|---|---|
| Monthly Recurring Access Charges | | |
| Performance Plus 500 for 02/15-03/15 | | 49.99 |
| Total Monthly Recurring Access Charges | | $49.99 |
| Adjustments and Other Charges | | |
| Courtesy Credit | 03/14/05 | -5.00 |
| Total Adjustments | | -$5.00 |
| Total Adjustments and Other Charges | | -$5.00 |
| Service Discounts | | |
| Enterprise Discount | | -4.99 |
| Total Service Discounts | | -$4.99 |
| Cellular Charges | | |
| Telecommunication Shared Usage Adjustment | | -3.30 |
| Overage | | |
| World Wide Service | | 3.30 |
| Total Cellular Charges | | 67.28 |
| | | $67.28 |
| | | Continued... |

FIGURE 1e

DETAILS for 916-555-1234, John Hill continued

> SUBSCRIBER ACTIVITY DETAIL

Text and Numeric Paging Detail

| Service Type | Peak/ Off Peak | Number of Pages | Billable Pages | Less Pages in Plan | Less Other Pages | Billable Pages | Rate | Total Rate Charges |
|---|---|---|---|---|---|---|---|---|
| Text & Numeric Paging | Peak | 6 | 6 | 0 | 0 | 6 | 0.25 | 1.50 |

Total Text and Numeric Paging Charges $1.50

Additional Messaging Detail

| Service Type | Peak/ Off Peak | Number of Messages in Plan | Billable Messages | Initial Rate | Initial Message | Less Other | Additional Rate | Additional Messages | Total Charges |
|---|---|---|---|---|---|---|---|---|---|
| Two-Way Messaging | | | 5 | 0.15 | | | 0.25 | 0 | 0.50 |
| Mobile Originated Messages | | 100 | 5 | 0.15 | 8 | | 0.10 | 0 | 0.00 |
| Multimedia Message | | | | | | | | | |
| France | | 0 | 4 | 0.10 | 4 | | 0.25 | 0 | 0.40 |
| Germany | | 0 | 6 | 0.10 | 6 | | 0.25 | 0 | 0.60 |

Total Additional Messaging Charges $1.50

Data Services Usage Detail

| Service | Peak/ Off Pk | Number of KB Used | Less KB in Plan | Less Other KB | Billable KB | Rate | Total Charges |
|---|---|---|---|---|---|---|---|
| Wireless Internet Services | Peak | 125000 | 120.0000 | | 0.0000 | 0.1000 | 0.00 |
| MMS Online | | | | | | | |
| United Kingdom | Peak | 95.0000 | 55.0000 | | 40.0000 | 0.0510 | 2.00 |

Total Data Services Charges $2.00

Third Party Services

| Third Party | Description | Quantity | Charge | Tax | Total |
|---|---|---|---|---|---|
| Tango | Ring Tone – Elise | | 1.88 | 0.12 | 2.00 |
| ZapCity | Games – Halo | 1 | 5.64 | 0.36 | 6.00 |
| WorkTools | Applications – Dry-wall Calculator | 1 | 11.48 | 0.52 | 12.00 |
| Tango | Adjustment – Elise | 1 | -6.00 | -0.50 | -6.50 |

Total Third Party Charges $13.50

Note: Carrier collects all charges, adjustments and/or taxes presented here on behalf of the third party.

---

| Plan | | Outgoing Off Peak | Min:Sec | Outgoing Peak | Min:Sec | Min:Sec | Min:Sec | Charges |
|---|---|---|---|---|---|---|---|---|
| Nationwide Dispatch Service | | | | | | | | |
| Performance Plus 500 | | Outgoing Peak | 32:29 | | | | 32:29 | 67.28 |
| International Dispatch Service | | | | | | | | |
| Performance Plus 500 | | Outgoing Peak | 15:30 | | | | 15:30 | 3.00 |
| Group Dispatch Service | | | | | | | | |
| Performance Plus 500 | | Outgoing Peak | 190:35 | | | | 190:35 | 4.90 |

Total Dispatch Charges $75.18

Note: This report represents minutes:seconds used as you make Nationwide Dispatch and International Dispatch and Group Dispatch calls during the billing period. See Subscriber Activity Detail for individual charges and minutes used.

Group Dispatch Service w/talkgroups Usage by Number of Participants

| Number of Participants | Min:Sec Used | Multiplier | Total Min:Sec |
|---|---|---|---|
| 2 | 106:45 | 2 | 213:30 |
| 2 | 66:67 | 2 | 133:34 |

Total Group Dispatch Service w/talkgroups Usage 346:64

Note: This report represents all group calls and is organized by number of participants. It provides the total number of minutes:seconds used by each group size. To calculate total minutes:seconds, we multiply minutes:seconds used by the multiplier.

---

> SERVICE INFORMATIONAL REPORTS

The following reports are compiled as a courtesy to help you analyze usage trends and manage your subscriber activity.

Your Rate Plan

| Plan | Services |
|---|---|
| Unlimited 1000 | Cellular |
| Performance Plus 500 | Cellular |
| | Dispatch |
| | Group Dispatch |
| Unlimited 500 | Dispatch |

Airtime Usage Detail

| Plan | Incoming/ Outgoing | Peak/ Off Peak | Total Min:Sec | Plan Min:Sec | Other Min:Sec | Billable Min:Sec | Total Charges |
|---|---|---|---|---|---|---|---|
| Performance Plus 500 | | | | | | | |
| Step 1 Cellular Usage | Incoming | Peak | 41:00 | 4:00 | | 37:00 | 2.10 |
| Cellular Usage | Outgoing | Peak | 13:00 | 1:00 | | 12:00 | 1.20 |
| Cellular Usage | Outgoing | Off Peak | 6:00 | 6:00 | | | |
| Dispatch Service | Outgoing | Peak | 150:00 | 100:00 | | 50:00 | 5.00 |
| Group Dispatch w/talkgroups | Outgoing | Peak | 257:05 | 100:00 | | 157:05 | 50.00 |

Total Airtime Charges $58.30

Dispatch Service Usage Detail

| | Incoming/ Peak/ | Total | Plan | Other | Billable | Total |
|---|---|---|---|---|---|---|

FIGURE 1g

SYSTEMS AND METHODS FOR GENERATING BILLS

BACKGROUND OF THE INVENTION

Consumers receive bills for all types of goods and services. Consumer demand for detailed billing has resulted in bills including a section summarizing the charges and at least one other section, which provides a detailed break-down of specific charges. Due to deregulation, mergers, acquisitions and the like, a single service provider may now provide a number of services, all of which appear on the same bill. Additionally, a consumer may have a number of different accounts for the same or similar services, which appear on the same bill. For example, a wireless service provider's bill can include charge categories for interconnect voice, dispatch voice, data, third party services, equipment rentals or purchases, and government fees and taxes for a number of different wireless devices. Each of the charge categories can have one or more charge subcategories appearing on different portions of the bill. To a consumer, the names of the charge subcategories may not appear to be related to the corresponding charge categories. Accordingly, it may be difficult for a consumer to correlate charges for a charge subcategory with the corresponding charge category.

SUMMARY OF THE INVENTION

The present invention addresses the above-identified and other deficiencies of conventional billing techniques by providing systems and methods for generating bills, which reduces consumer confusion when reconciling charges between different portions of a bill. In accordance with the present invention, bills are generated with symbols located in proximity to various charge categories and the corresponding charge subcategories. Each occurrence of a charge category and a corresponding charge subcategory throughout the different portions of the bill can include a symbol associated with the particular charge category. By providing unique symbols for each charge category, the present invention allows consumers to easily identify charges belonging to particular charge categories.

In accordance with one aspect of the present invention, charges for a plurality of charge categories are determined, and symbols associated with each of the plurality of charge categories are identified. A bill is then generated, which identifies the charges for the plurality of charge categories, and includes the associated symbols in proximity to the charges for each of the plurality of charge categories.

Other objects, advantages and novel features of the present invention will become apparent from the following detailed description of the invention when considered in conjunction with the accompanying drawings.

BRIEF DESCRIPTION OF THE DRAWING FIGURES

FIG. 1a illustrates an exemplary monthly account invoice portion of a bill in accordance with the present invention;

FIGS. 1c and 1d illustrate an exemplary account charges and adjustments portion of a bill in accordance with the present invention;

FIGS. 1e-1g illustrate an exemplary subscriber charges and adjustments portion of a bill in accordance with the present invention.

DETAILED DESCRIPTION OF THE PREFERRED EMBODIMENTS

Figure 1B:
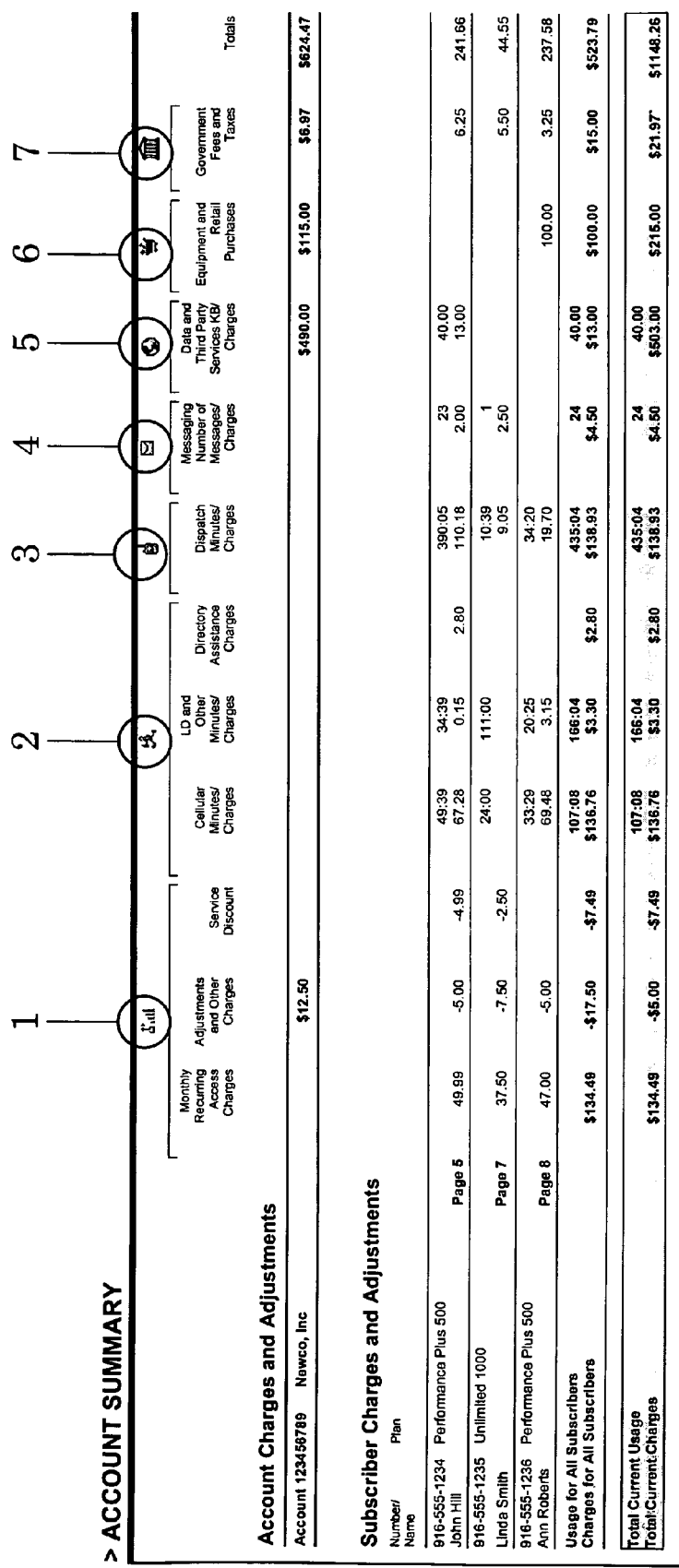
FIG. 1b illustrates an exemplary account summary portion of a bill in accordance with the present invention.

FIGS. 1a-1g illustrate exemplary portions of a wireless communication services bill in accordance with the present invention. The monthly account invoice portion of the bill illustrated in FIG. 1a provides a brief summary of charges for a plurality of charge categories for a wireless communication service account. As illustrated in FIG. 1a, symbols are located in proximity to each of the plurality of charge categories, which are useful for identifying charges belonging to a particular charge category.

For the Access and Related Items charge category, a symbol 1, which comprises an antenna and signal strength bars, is used to identify the charge category. The Cellular Services charge category is identified by symbol 2, which is a person walking with a mobile telephone. The Dispatch Services charge category is represented by a mobile telephone symbol 3. The Messaging Services charge category is represented by an envelope symbol 4. The Data and Third Party Services charge category is represented by a globe symbol 5. The Equipment and Retail Purchases charge category is represent by a shopping cart symbol 6, and the Government Fees and Taxes charge category is represented by a building symbol 7.

Although particular symbols are illustrated for particular charge categories, any type of symbol can be used, as long as the symbol is used to consistently identify charges belonging to the same charge category. For example, instead of the image symbols illustrated in the Figures, shapes, numerals (Roman or Arabic), other images, or the like can be used as symbols.

FIG. 1b illustrates an exemplary account summary portion of a bill in accordance with the present invention. The account summary portion identifies charges for each subscriber on the account for each of the plurality of charge categories. The account summary portion also breaks down charges for the plurality of charge categories into one or more charge subcategories. For example, the Access and Related Items charge category includes Monthly Recurring Access Charges, Adjustment and other Charges, and Service Discount subcategories. Accordingly, the symbol associated with the Access and Related Items charge category is located in proximity to the aforementioned charge subcategories. Moreover, brackets or the like can be used to facilitate illustration of the relationship between the symbol and the category/subcategory.

Figure 1C:
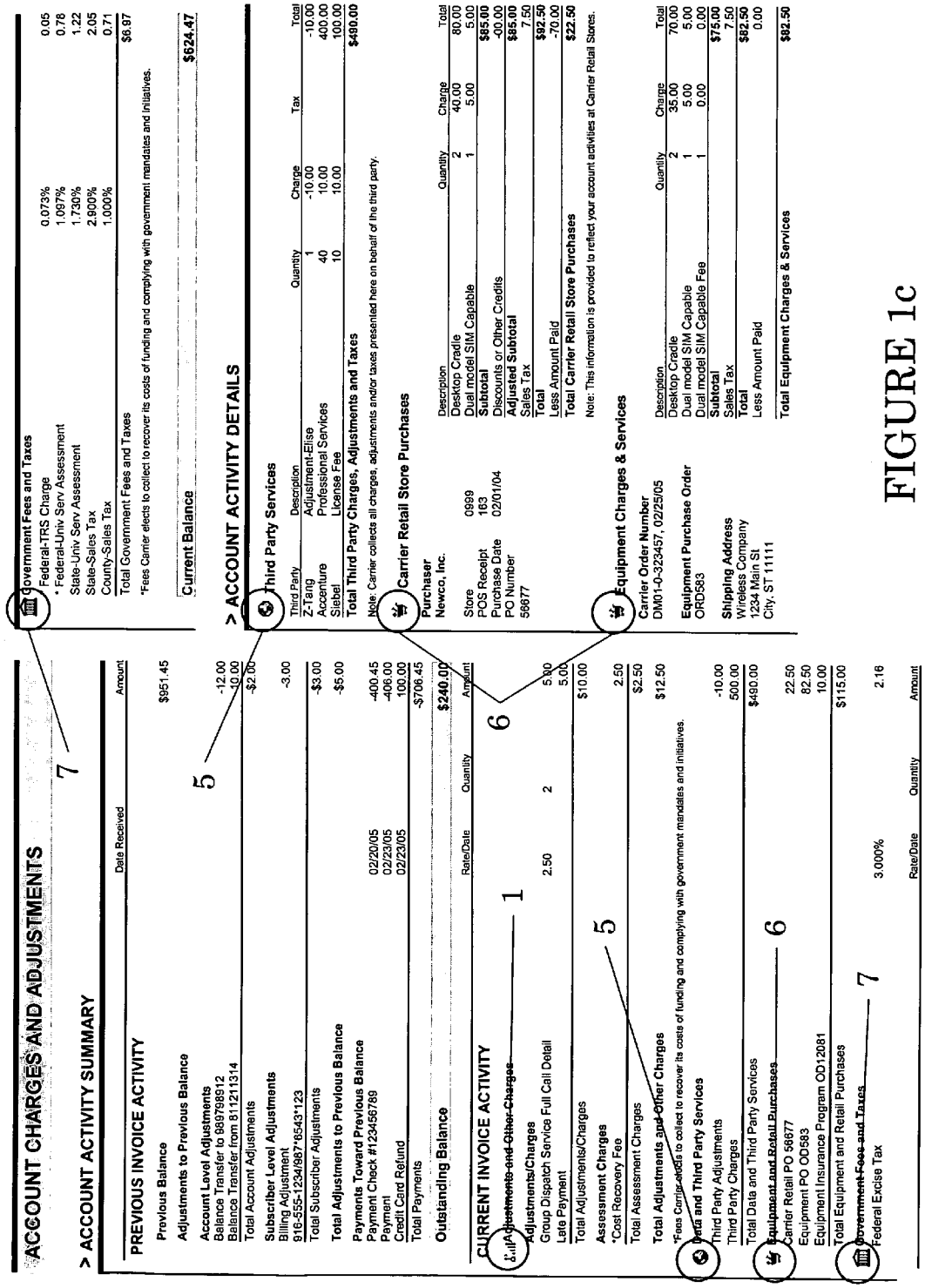

FIGS. 1c and 1d illustrate an exemplary account charges and adjustments portion of a bill in accordance with the present invention. The charges and adjustments illustrated in this portion of the bill are an aggregation of charges and adjustments for all of the subscribers on the account. This portion of the bill includes account summary, an account activity details, and account management reports sections. The account summary portion identifies the previous and current invoice activity for the account, and includes symbols associated with each charge category in proximity to the corresponding charge subcategory.

The account activity details portion identifies charges for third party service and equipment purchases, and includes symbols associated with each charge category in proximity to the corresponding charge subcategory. The account management report portion of the bill identifies charges for airtime and dispatch usage for the account.

Figure 1F:
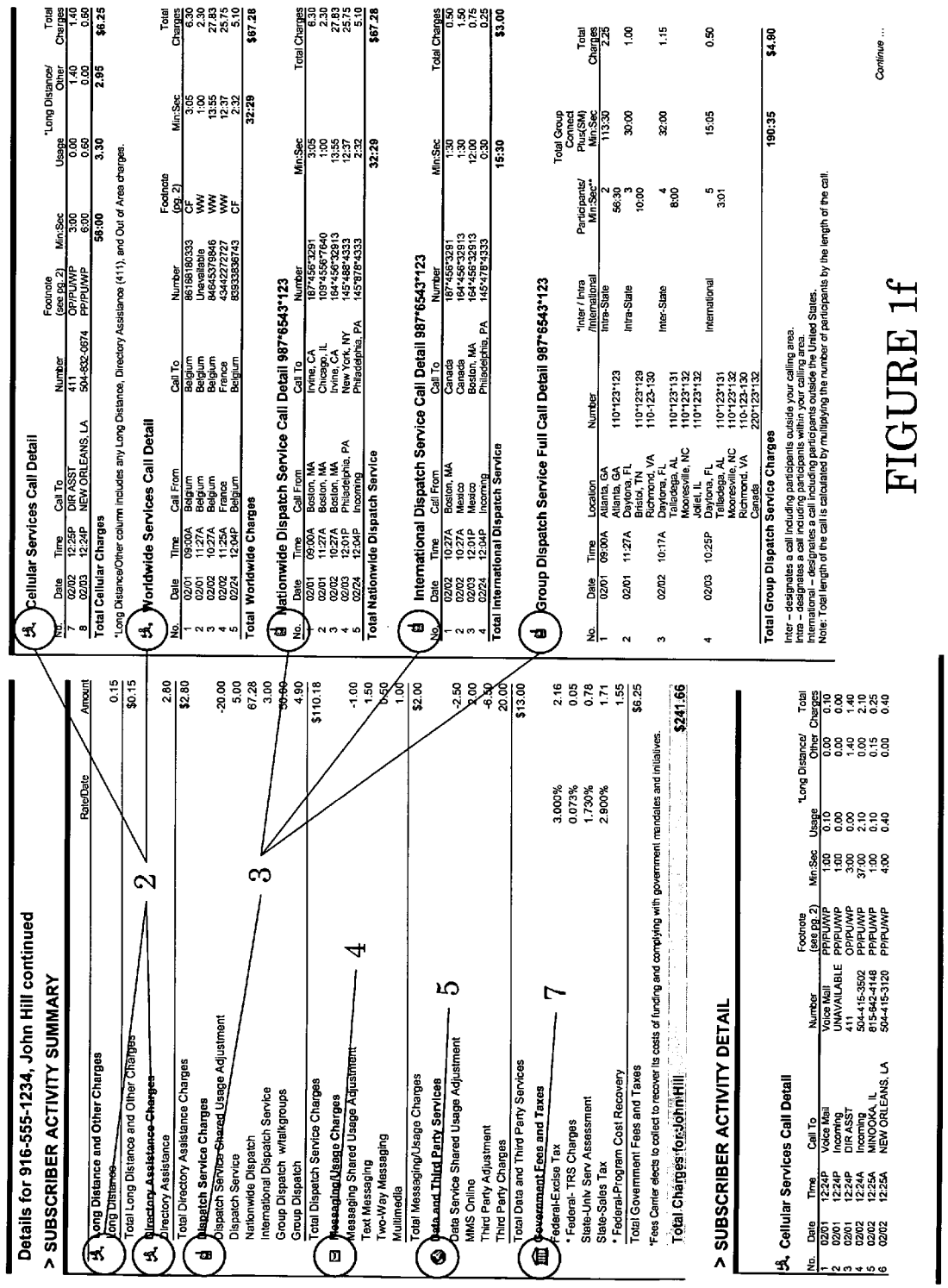

FIGS. 1e-1g illustrate an exemplary subscriber charges and adjustments portion of a bill in accordance with the present invention. The charges and adjustments on this part of the bill are for a particular subscriber, and include a symbol associated with a charge category located in proximity to the corresponding charge subcategory. Although a subscriber charges and adjustments portion of the bill is illustrated for only one of the subscribers of the account, the bill will include similar portions for each of the other subscribers of the account.

The subscriber charges and adjustment portion of the bill includes subscriber activity summary, subscriber activity detail and service informational reports portions. The subscriber activity summary portion of the bill identifies charges and adjustments. The subscriber activity detail portion of the bill provides the details of each of the charges corresponding to some of the charge subcategories from the subscriber activity summary portion of the bill. The service informational reports section details a subscriber's rate plan and the amount of services used for the rate plan.

Although FIGS. 1a-1g illustrate a bill for wireless communication services, the use of symbols to identify charge categories and corresponding subcategories can be employed on any type of bill.

Figure 2:
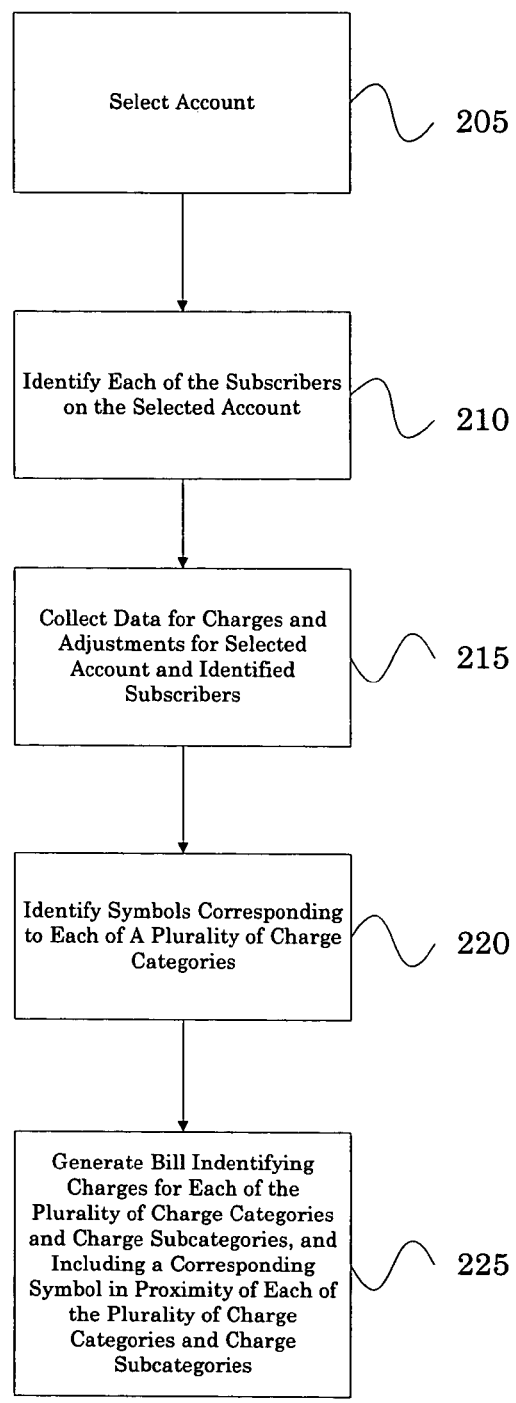
FIG. 2 illustrates an exemplary method for generating a bill in accordance with the present invention.

FIG. 2 illustrates an exemplary flowchart of a method for generating a bill in accordance with the present invention. Initially, an account is selected (step 205) and each of the subscribers for the selected account are identified (step 210). Data for charges and adjustments for the selected account and identified subscribers are collected (step 215). If there is only one subscriber on an account or if the type of bill being generated does not relate to a service in which charges for multiple subscribers will appear on a bill, then step 210 may be omitted, and step 215 would only involve collecting data for charges and adjustments for the selected account. Next, symbols corresponding to each of a plurality of charge categories are identified (step 220). A bill is generated identifying charges for each of the plurality of charge categories and charge subcategories, and including a corresponding symbol proximately located next to each of the plurality of charge categories and charge subcategories (step 225). The method illustrated in FIG. 2 can be performed by a processor with associated memory (such as a computer-readable medium), an application specific integrated circuit (ASIC), field programmable gate array (FPGA), or the like, in conjunction with an appropriate output device such as a bill printer. For electronic bills, the output device could be an appropriate display.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for generating a bill, comprising the acts of:
    determining charges for a plurality of charge categories of a communication services account;
    identifying symbols associated with each of the plurality of charge categories;
    generating a bill, for the communication services account, identifying the charges for the plurality of charge categories and a total charge, wherein the bill includes the associated symbols in proximity to the charges for each of the plurality of charge categories.

2. The method of claim 1, wherein the act of generating the bill comprises the acts of:
    generating a first portion of the bill identifying the charge categories, and including the associated symbols in proximity to the charges for each of the plurality of charge categories; and
    generating a second portion of the bill identifying charge subcategories, each of which correspond to at least one of the plurality of charge categories, wherein the symbols associated with the corresponding charge categories are located in proximity to the charge subcategories.

3. The method of claim 2, wherein the first portion of the bill is an account summary.

4. The method of claim 3, wherein the account summary portion includes account charges and adjustments, and subscriber charges and adjustment portions.

5. The method of claim 1, further comprising the act of:
    identifying each subscriber associated with an account for the bill,
    wherein the act of generating the bill includes the acts of
        generating a first portion of the bill identifying the charge categories, and including the associated symbols in proximity to the charges for each of the plurality of charge categories; and
        generating a second portion of the bill identifying charge subcategories, which correspond to at least one of the plurality of charge categories, wherein the symbols associated with the corresponding charge categories are located in proximity to the charge subcategories and the second portion of the bill identifies charges for each subscriber associated with the account for the bill.

6. The method of claim 1, wherein the plurality of charge categories include access, cellular services, dispatch services, messaging services, data services, equipment purchases or government fees and taxes.

7. The method of claim 1, wherein the symbols associated with each of the plurality of charge categories are images related to each particular one of the plurality of charge categories.

8. The method of claim 1, wherein the symbols associated with each of the plurality of charge categories are shapes.

9. The method of claim 1, wherein the bill is a telecommunication services bill.

10. A computer-readable medium having computer-executable instructions for performing the acts of:
    determining charges for a plurality of charge categories of a communication services account;
    identifying symbols associated with each of the plurality of charge categories;
    generating a bill, for the communication services account, identifying the charges for the plurality of charge categories and a total charge, wherein the bill includes the associated symbols in proximity to the charges for each of the plurality of charge categories.

11. The computer-readable medium of claim 10, wherein the act of generating the bill comprises the acts of:
    generating a first portion of the bill identifying the charge categories, and including the associated symbols in proximity to the charges for each of the plurality of charge categories; and
    generating a second portion of the bill identifying charge subcategories, each of which correspond to at least one of the plurality of charge categories, wherein the symbols associated with the corresponding charge categories are located in proximity to the charge subcategories.

12. The computer-readable medium of claim 11, wherein the first portion of the bill is an account summary.

13. The computer-readable medium of claim 12, wherein the account summary portion includes account charges and adjustments, and subscriber charges and adjustment portions.

14. The computer-readable medium of claim 10, having computer-executable instructions for performing the act of:
identifying each subscriber associated with an account for the bill,
wherein the act of generating the bill includes the acts of
generating a first portion of the bill identifying the charge categories, and including the associated symbols in proximity to the charges for each of the plurality of charge categories; and
generating a second portion of the bill identifying charge subcategories, which correspond to at least one of the plurality of charge categories, wherein the symbols associated with the corresponding charge categories are located in proximity to the charge subcategories and the second portion of the bill identifies charges for each subscriber associated with the account for the bill.

15. The computer-readable medium of claim 10, wherein the plurality of charge categories include access, cellular services, dispatch services, messaging services, data services, equipment purchases or government fees and taxes.

16. The computer-readable medium of claim 10, wherein the symbols associated with each of the plurality of charge categories are images related to each particular one of the plurality of charge categories.

17. The computer-readable medium of claim 10, wherein the symbols corresponding to each of the plurality of charge categories are shapes.

18. The computer-readable medium of claim 10, wherein the bill is a telecommunication services bill.

* * * * *

UNITED STATES PATENT AND TRADEMARK OFFICE
CERTIFICATE OF CORRECTION

PATENT NO. : 7,599,479 B2  Page 1 of 1
APPLICATION NO. : 11/104494
DATED : October 6, 2009
INVENTOR(S) : Maestas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1211 days.

Signed and Sealed this

Twenty-eighth Day of September, 2010

David J. Kappos
*Director of the United States Patent and Trademark Office*